United States Patent [19]
Kuehn et al.

[11] 3,855,863
[45] Dec. 24, 1974

[54] METHOD AND APPARATUS FOR DETERMINING WET BULB GLOBE TEMPERATURE

[75] Inventors: Lorne A. Kuehn, Downsview, Ontario; Lloyd E. McHattie, Willowdale, Ontario, both of Canada

[73] Assignee: Her Majesty the Queen in Right of Canada as represented by the Minister National Defence

[22] Filed: Dec. 19, 1973

[21] Appl. No.: 426,025

[52] U.S. Cl. ............... 73/339 C, 73/336, 73/336.5, 73/344
[51] Int. Cl. ......................... G01w 1/17, G01k 3/00
[58] Field of Search ....... 73/336, 336.5, 338, 339 C, 73/355 R, 344, 170 R

[56] References Cited
UNITED STATES PATENTS

| | | | |
|---|---|---|---|
| 2,154,927 | 4/1939 | Yaglou | 73/355 R |
| 2,186,948 | 1/1940 | Alder | 73/355 R |
| 2,398,333 | 4/1946 | Shoemaker | 73/336.5 X |
| 2,685,795 | 8/1954 | Hardy et al. | 73/339 C X |
| 3,521,488 | 7/1970 | Preiser et al. | 73/344 X |
| 3,531,991 | 10/1970 | Strong et al. | 73/355 R |
| 3,664,193 | 5/1972 | Nielsen | 73/339 C UX |
| 3,719,810 | 3/1973 | Ahlquist et al. | 73/336.5 X |

Primary Examiner—Richard C. Queisser
Assistant Examiner—Frederick Shoon
Attorney, Agent, or Firm—R. William Wray & Associates

[57] ABSTRACT

A method of, and apparatus for, determining the wet bulb globe temperature (WBGT) of the surroundings as defined by WBGT= 0.7 WB + 0.2 GT + 0.1 DB, where WB is the web bulb temperature, GT is the 6 inch black globe temperature and DB is the shaded dry bulb temperature, of said surroundings. The method and apparatus include the steps of, and means for: locating a wet bulb thermometer in said surroundings to provide a first signal representative of the wet bulb temperature (WB) of said surroundings, locating a globe thermometer having a globe of a predetermined diameter (preferably about 1.65 inches diameter) in said surroundings such that the measured globe temperature is approximately equal to 2/3 GT + 1/3 DB, as defined above, to provide a second signal representative of said measured globe thermometer temperature of the surrroundings whereby, by applying a weighting factor of 0.3 to the second signal and a weighting factor of 0.7 to said first signal by means of a resistor network, a third or weighted summation signal is obtained; comparing said weighted summation signal with a reference signal by means of an operational amplifier to provide a fourth signal corresponding to the difference therebetween, and providing said fourth signal to an indicator meter whereby an indication is obtained corresponding to the web bulb globe temperature (WBGT) of said surroundings.

20 Claims, 5 Drawing Figures

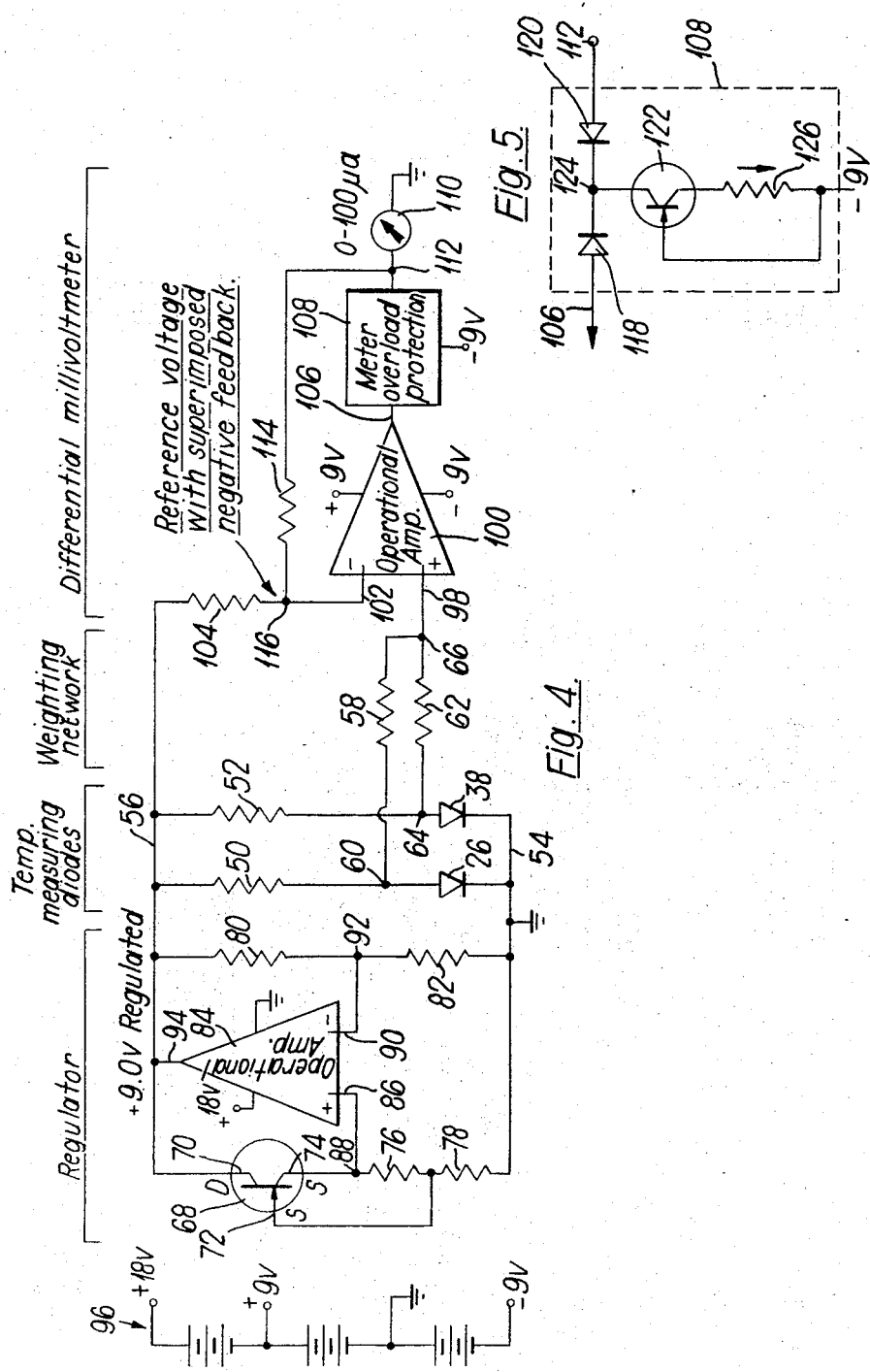

METHOD AND APPARATUS FOR DETERMINING WET BULB GLOBE TEMPERATURE

BACKGROUND OF THE INVENTION

The present invention relates to a method and apparatus for measuring wet bulb globe temperatures and, more particularly, to electronic apparatus for giving a direct indication of such temperatures.

As is well known, the wet bulb globe temperature is a practical index of heat stress on living organisms, notably human beings, in hot environments. It is a composite measure of the four factors affecting thermal comfort in man, namely, air temperature, relative humidity, air movement and thermal radiation level. The wet bulb globe temperature is calculated from the formula:

$$WBGT = 0.7\ WB + 0.2\ GT + 0.1\ DB \quad (1)$$

where
 $WBGT$ = wet bulb globe temperature index
 $WB$ = natural wet bulb temperature
 $GT$ = 6 inch black globe temperature
and
 $DB$ = shaded dry bulb temperature.

The above temperatures may be in °C. or °F. The globe temperature is a composite measure of thermal radiation and convention and conduction exchange with the environment and is measured with a temperature sensor positioned at the centre of a standard 6 inch diameter metallic globe with a blackened surface.

At present the most common method of measuring the wet bulb globe temperature (hereinafter referred to as the WBGT) of a particular environment is by measuring the three individual temperatures, the wet bulb temperature, the globe temperature and the dry bulb temperature and substituting these measurements into the above formula to determine the WBGT value. Each individual determination of a WBGT with this method requires approximately 5 minutes. None of the three temperature measurements are made at exactly the same time so that the WBGT value derived does not represent an instantaneous value applicable to the particular environment. Additionally, errors can be made in the individual temperature measurements or in the calculation itself, thus requiring individual checking and verification of these steps.

To overcome the above disadvantages, various electronic WBGT meters have been proposed which electronically combine the readings of three temperature sensors into one value which is displayed on a single WBGT scale. The types of sensor generally used and the circuitry usually employed in these devices do not, however, lend themselves to accurate measurement of the WBGT over the particular range of interest (75°F. – 95°F.). Present instruments are limited generally to an accuracy of ±1°C. from the actual WBGT value. Additionally, the previously proposed WBGT meters incorporate three sensors, a dry bulb temperature sensor, a wet bulb temperature sensor, and a globe temperature sensor. The globe temperature sensor is usually the standard 6 inch diameter globe which has a time of response to a temperature change in the order of 20 minutes so that, in environments of rapidly changing heat stress, these instruments do not measure the instantaneous WBGT value.

It is an object of the present invention to provide an improved method of determining the wet bulb globe temperature of the surroundings in which a single direct indication can be obtained for the web bulb globe temperature at a particular instant in time.

Accordingly, there is provided a method of determining the wet bulb globe temperature of the surroundings including the steps of: locating a wet bulb thermometer in said surroundings to provide a first signal representative of the wet bulb temperature of said surroundings, locating a globe thermometer having a globe of a predetermined diameter in said surroundings to provide a second signal representative of the measured globe thermometer temperature of the surroundings, said predetermined diameter being so chosen that the measured globe temperature approximates two-thirds the standard 6 inch globe temperature of said surroundings plus one-third the dry bulb temperature of said surroundings, applying a weighting factor of 0.7 to said first signal to provide a third signal, applying a weighting factor of 0.3 to said second signal to provide a fourth signal, electronically summing said third and fourth signals to provide a weighted summation signal, comparing said weighted summation signal with a reference signal to provide a fifth signal corresponding to the difference therebetween, and providing said fifth signal to indicator means whereby an indication is obtained corresponding to the wet bulb globe temperature of said surroundings.

DRAWINGS

In the accompanying drawings which illustrate an embodiment of the present invention, FIG. 1 is a perspective view of a WBGT apparatus in accordance with the present invention;

FIG. 4 is a typical diagrammatic representation of an electronic circuit for the apparatus of FIG. 1; and FIG. 5 is a diagrammatic representation of the meter overload protection unit of FIG. 4.

DETAILED DESCRIPTION

Figure 1:
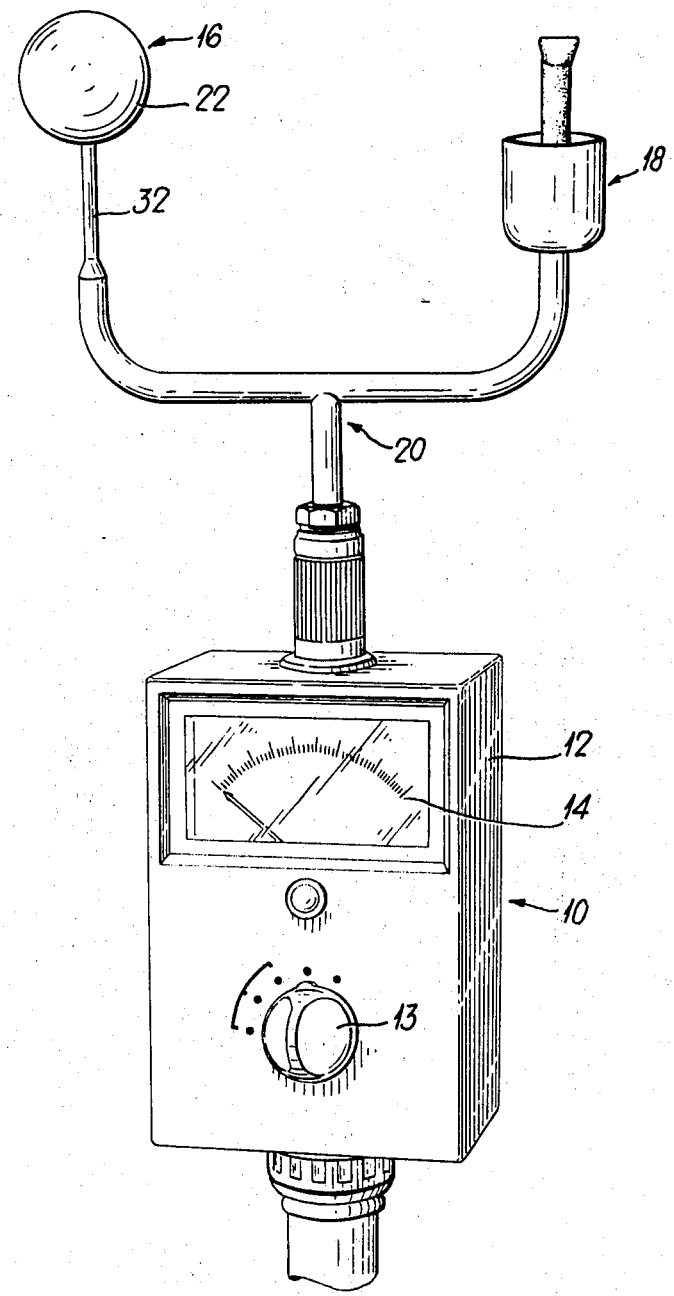

Referring to the drawings and more particularly, to FIG. 1, there is shown apparatus 10 for determining the WBGT of an environment. The apparatus 10 includes a casing 12 for an indicating meter 14 and electronic circuitry to be hereinafter described. A rotary knob 13 projects from the front face of casing 12 for providing an on-off switch and battery testing facilities.

Apparatus 10 further includes a globe thermometer 16, a wet bulb thermometer 18, and a Y-shaped support 20 mounting the two thermometers to the casing 12. The globe thermometer 16 and the web bulb thermometer 18 are mounted on respective arms of support 20 and the stem of support 20 is secured to the top of casing 12.

Figure 2:
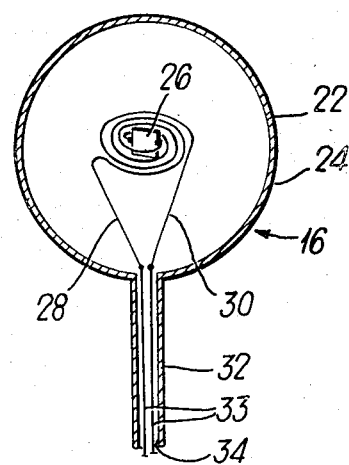
FIG. 2 is a cross-sectional view of the globe thermometer used in the apparatus of FIG. 1.

The structure of the globe thermometer 16 is more particularly shown in FIG. 2 and consists of a hollow copper globe 22 having a black coating 24 on its outer surface. A silicon diode temperature sensor 26 is positioned at the centre of globe 22.

Sensor 26 is connected to the other circuitry by way of a pair of leads 28 and 30 of low thermal conductivity, each making two turns about diode 26 and extending from the diode to a position adjacent the connection of globe 22 to a supporting tube 32. At that position the leads 28 and 30 are soldered to respective ones of two copper wires 33 that extend through an axial bore 34 through tube 32. The copper wires 33 also extend through support 20 to the interior of casing 12.

As has been previously mentioned, the globe temperature to be used in formula (1) for calculating WBGT is the temperature within a standard 6 inch globe. This temperature is not, however, exclusively a function of the thermal radiation of the environment. The ambient air temperature (dry bulb temperature) and wind velocity are also determining factors since the globe is in conductive and convective heat transfer relationship with the ambient atmosphere. In the method and apparatus according to the present invention, the need for a dry bulb thermometer and its associated circuits is eliminated by using a globe which is considerably smaller than the standard 6 inch size. Investigation has shown that a globe thermometer of predetermined diameter can be constructed and connected so as to give an output temperature reading which is a sufficient approximation to two-thirds of the globe temperature (standard 6 inch globe) plus one-third of the dry bulb temperature. Then by applying a weighting factor of 0.3 to said output temperature reading, applying a weighting factor of 0.7 to the natural wet bulb thermometer temperature taken at the same time and summing, one obtains the wet bulb globe thermometer temperature without a separate measurement of the dry bulb temperature of the invironment.

This can be more readily understood by rewriting formula (1):

$$WBGT = 0.7\ WB + 0.2\ GT + 0.1\ DB$$

i.e., $$WBGT = 0.7\ WB + 0.3(2/3 GT + 1/3 Db)$$

or $$WBGT = 0.7\ WB + 0.3\ Gt_i \quad (2)$$

where $GT_i$ is the globe temperature as measured by sensor 26 according to the present invention.

From formula (2) it can clearly be seen that a knowledge of the dry bulb temperature DB is not required, but only of the wet bulb temperature WB and of the globe temperature $GT_i$ for a globe according to the invented apparatus and as shown in FIGS. 1 and 2. Extensive experiments have shown that an approximation to the required globe temperature $GT_i$ can be obtained by arranging that the diameter of globe 22 is slightly less than 2 inches. The approximation depends to some extent on the wind velocity, particularly at very low velocities. The best overall approximation has been found to be obtained when the predetermined diameter of globe 22 lies in the neighbourhood of 1.65 inches.

When an electric sensor is used to measure an air temperature, particularly when there is little or no air motion as within a globe, it is important to ensure that the thermal current in the leads to the sensor is not sufficient to cause any significant temperature gradient in the air surrounding the sensor and a consequent error in the temperature indication. Diode leads of 2 cm. in length have no greater thermal resistance than the air outside a sphere 0.25 cm. in diameter even if the leads are made from a low thermal conductivity alloy. Accordingly, in the globe thermometer two extra 6 cm. lengths of No. 28 Chromel P wire are added to the 2 cm. leads of the diodes and each is spiralled two turns about the diode in a horizontal plane (as shown in FIG. 2) befor being extended down to the associated copper wires for connection in the electronic circuit. This not only increases the thermal resistance of the leads but also places the leads in a region of low temperature gradient so that any thermal current to or from the sensor will be minimized.

Figure 3:
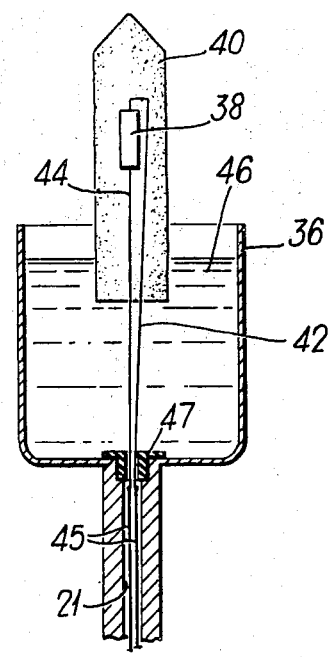
FIG. 3 is a cross-sectional view of the wet bulb thermometer used in the apparatus of FIG. 1.

Turning now to FIG. 3, the wet bulb thermometer is illustrated as consisting of a cup 36 mounted on the top of one of the arms of support 20 (FIG. 1), a silicon diode temperature sensor 38 positioned above the cup, a wick 40 surrounding the silicon diode temperature sensor 38 and extending from inside cup 36 to above the temperature sensor. The two leads 42 and 44 of temperature sensor 38 extend from the sensor 38 down through cup 36 and into the end of a bore 21 through support 20. At this point the leads 42 and 44 are connected to respective ones of two copper lead wires 45 that extend through bore 21 in support 20 to the interior of casing 12. The leads 42 and 44 extend through a plug 47 which seals the bore 21 from the interior of cup 36 in a water-tight manner.

The cathode end of diode 38 is uppermost since the temperature sensitive silicon die is located at this end. The wetted sleeve, i.e., wick 40, is a cylinder about 7 millimetres in diameter to yield the same wet bulb temperature as standard mercury-in-glass thermometers as used for this purpose.

In operation, the cup 36 is partially filled with water 46 as indicated in FIG. 3 so as to saturate the wick 40. The evaporation of water from wick 40 cools temperature sensor 38 to the wet bulb temperature as is well known with wet bulb thermometers.

Heat leakage along leads 42 and 44 of the wet bulb thermometer diode 38 is in one respect less serious than heat leakage along the leads 28 and 30 to diode 26 of globe thermometer 16 since the wet wick 40 uses the latent heat of vaporization of the water to maintain its temperature and thus constitutes a thermal source of lower impedance. It will, however, be noted that in the equation for the WBGT, the weighting (0.7) of the wet bulb temperature is more than double the weighting (0.3) of the globe temperature ao that an error in the wet bulb temperature will have more effect. This effect is minimized in the present wet bulb thermometer by passing the leads 42 and 44 through the water in cup 36. Since the water tends to cool down to near the wet bulb temperature, it functions as a thermal guard and reduces any heat leak along the leads 42 and 44.

The silicon diode temperature sensors 26 and 38 are connected in an electronic circuit whereby a very nearly constant current is supplied to each and they are connected in circuit with particular resistances having calculated values so that the required weighting factors are applied to the voltage signal outputs obtained from the silicon diode temperature sensors and respectively representative of the wet bulb temperature of the surroundings (from sensor 38) and the measured globe thermometer temperature of the surroundings (sensor 26). A weighted sum of the signals from the temperature sensors 26 and 38 appears at 66 and is utilized to control an indicator device so as to provide an indication corresponding to the wet bulb globe temperature of the surroundings as defined by formula (1) above. One circuit for use with the temperature sensors 26 and 38 is illustrated in FIG. 4 and it will be seen that the temperature sensors 26 and 38 are connected in series with respective resistors 50 and 52 between a common lead 54 at ground potential and a common lead 56 to which a positive potential of +9 volts (regulated) is app.ied as will be explained below. A resistor 58 is connected to the junction 60 of silicon diode sensor 26 and resistor 50 whilst a further resistor 62 is connected to the junction 64 of silicon diode sensor 38 and resistor 52, the other end of resistors 58 and 62 being connected to a common junction 66. Since the silicon diode temperature sensors 26 and 38 are supplied with constant current due to the regulated voltage on lead 56, electrical voltage signal outputs which they provide are linearly related to the respective temperature.

The ratio of the resistance of resistor 58 to the resistance of resistor 62 is so chosen that there is obtained at junction 66 a weighted summation signal which is the sum of the voltage signal at junction 60 multiplied by a weight of 0.3 and of the voltage signal at junction 64 multiplied by a weight of 0.7. The difference between said weighted summation signal and a d.c. reference voltage is utilized to provide an indication corresponding to the wet bulb globe temperature of the surroundings.

In order to obtain a regulated voltage of 9 volts on lead 56, a regulator circuit consisting of a field effect transistor 68 — having a drain electrode 70, a gate electrode 72 and a source electrode 74 — in series with a resistor 76 and a resistor 78, the series arrangement being connected between the ground lead 54 and the positive lead 56 as shown in FIG. 4 with the gate electrode 72 connected to the junction of resistors 76 and 78. A series arrangement of two resistors 80 and 82 is also connected between the ground lead 54 and the positive lead 56. An operational amplifier unit 84 is provided with voltage connections of +18 volts and ground as shown in FIG. 4. Its non-inverting (+) input terminal 86 is connected to the junction 88 of transistor source terminal 74 and resistor 76 whilst the inverting (−) terminal 90 of operations amplifier 84 is connected to the junction 92 of the resistors 80 and 82. Its single-ended output terminal 94 is connected to the positive lead 56 as shown.

It will be clear that the regulator section of FIG. 4, consisting of the four legs including the field-effect transistor 68, and the resistors 76, 78, 80 and 82, together with the operational amplifier 84, operates to ensure that the voltage applied to the lead 56 is regulated at +9 volts. The operation of the regulator may be described as follows. The junction field-effect transistor operates as a constant current device with the result that the voltage at 88 would remain sensibly constant, even assuming a variation in the output voltage at 56. Any variation in the output voltage at 56 would, however, appear in attenuated form (typically one-half) at 90. The operational amplifier automatically adjusts its output voltage such that its two inputs are at the same potential. As a result the output voltage 56 (94) is given by $$V_o = i_c (R_1 + R_2)(R_3 + R_4)/R_4$$

wherein $i_c$ is the constant current.

A valuable feature of this regulator circuit is that it provides means to adjust the temperature coefficient of its output voltage to zero at room temperature. The adjustment is effected by varying $R_1$ (76) which varies the magnitude of the constant current. Depending on the individual FET being used and the ambient temperature, a particular value of current can generally be found at which the temperature coefficient of the constant current passes through zero and, if the temperature coefficients of the operational amplifier and resistors are not too great, a nearby value of current will give zero temperature coefficient of the regulator output voltage.

By way of example, a battery network 96 is illustrated in FIG. 4 whereby voltages obtained with respect to ground potential are −9 volts, +9 volts, and +18 volts for operation of the circuit illustrated in FIG. 4.

As mentioned above, the weighting network comprising resistors 58 and 62 produces at the non-inverting or (+) input 98 of the operational amplifier 100 a weighted sum of the voltage signals of the temperature sensing diodes 26 and 38. In similar fashion, another weighting network comprising resistors 104 and 114 produces at the inverting or (−) input 102 of the operational amplifier a weighted sum of the regulated positive supply voltage and the operational amplifier output voltage, the respective weights being typically 0.068 and 0.932. The former is a fixed reference voltage while the latter is the negative feedback signal. By adjustment of resistor 114, said reference voltage is made equal to the voltage presented to the non-inverting (+) input of the operational amplifier by diodes 26 and 38 when their temperature corresponds to that at the left hand end of the meter scale. The operational amplifier 100 is provided with supplies of +9 volts and −9 volts as shown, and, being differential, produces at its output 106 a signal which is the amplified difference between the two input signals. Because of the large voltage gain of the operational amplifier (about $10^5$), its operation may be taken to be such as will at all times bring its two inputs to virtually the same potential. Thus, with feedback, the gain for a change in the voltage at the non-inverting input is $(R_9+R_{10})/R_9$ which is typically about 1.07. The signal at the operational amplifier output 106 is applied through a meter overload protection unit 108, which is supplied with a −9 volt potential, and whose output at 112 is supplied to an indicating device 110 in the form of a meter (0 to 100 $\mu$ amp). The meter sensitivity is adjusted by varying a resistor in series with the meter. A part of the circuit from resistor 104 through to meter 110 may conveniently be regarded as a differential millivolt meter and it will be appreciated that the meter 110 is actually the indicating meter 14 of FIG. 1 calibrated to indicate the WBGT index.

It will be appreciated that the comparing means including amplifier 100 is required specifically for the case of semi-conductor diode temperature sensors which give a signal of the form $V = a + bT$ where $a$ and $b$ are constants and T is the temperature. Subtracting the constant reference voltage removes the $a$. Other types of temperature sensor would not likely give a signal of the same form and would require a more complicated treatment.

One form of overload protection unit 108 is illustrated in FIG. 5 and will be seen to include two diodes 118 and 120. The drain electrode of a FET (N channel) 122 is connected to the junction 124 between diodes 118 and 120 whilst its source electrode is connected through a resistor 126 to the −9 volt supply. It will be observed that the gate electrode of transistor 122 is also connected to the −9 volt supply as shown.

The circuit faults to be protected against are the two cases when the operational amplifier output 106 goes to limiting values near +9 volts or −9 volts. In the first case diode 118 conducts and 124 assumes a potential near +9 volts, the operational amplifier supplying all of the 250 μA. constant current in FET 122. Diode 120 is cut off and the 100 μA. in $R_9$ and $R_{10}$ flows through the meter in the reverse direction to ground. In the second case diode 118 is cut off while 120 conducts and the 250 μA constant current is supplied by 100 μA. from $R_{10}$ and 150 μA. from ground through the meter in the forward direction. Under normal operation, both diodes are conducting and share in making up the 250 μA. constant current.

The presence of the protection circuit 108 should ensure that if one of the temperature sensor diodes 26 or 38 short-circuits or open-circuits or becomes in some other way wrongly connected, then the meter 110 will be protected. Such protection will also be present in case there is a fault in the operational amplifier 100 which would normally provide several milliamps before limiting. In a practical embodiment it was found that the illustrated circuit restricted the meter current within the range −100 microamps to +150 microamps when resistors 104 and 114 are selected to carry 100 microamps and resistor 126 is adjusted until its current is 250 μA.

Since the meter overload protection unit 108 was connected within the negative feedback loop it was found not to affect the gain accuracy to any appreciable extent.

It will be appreciated that the novel overload protection circuit illustrated in FIG. 5 may be of general application for limiting the maximum current which can be supplied by a voltage source to a load device having one terminal connected to ground potential. It may take alternate forms:

1. Two diodes arranged with both cathode electrode connected to the drain electrode of an N-channel FET whose gate is directly connected and whose source electrode is connected through a resistor to a negative voltage source (as in FIG. 5). The two diode anodes are connected one to the voltage source and the other to the load device, as shown;

2. Two diodes arranged with both node electrodes connected to the drain electrode of a P-channel FET whose gate is connected through a resistor to a positive voltage supply, the two diode cathodes being connected one to the voltage source, the other to the load device.

If the said negative or positive voltage supply is relatively constant and is large compared to the maximum voltage drop in the load device, the FET may in each case be replaced by a simple resistor.

A practical embodiment of the invention was designed to be portable and to have relatively low current drain thus suiting it for operation from batteries. The simplicity of the regulator circuit was particularly advantageous and it was found to provide relatively high stability.

We claim:

1. A method of determining the wet bulb globe temperature of surroundings including the steps of:
   a. locating a wet bulb thermometer in said surroundings to provide a first signal representative of the wet bulb temperature of said surroundings,
   b. locating a globe thermometer having a globe of a predetermined diameter in said surroundings to provide a second signal representative of the measured globe thermometer temperature of the surroundings, said predetermined diameter being such that the measured globe thermometer temperature closely approximates the sum of two-thirds the standard 6 inch globe temperature of said surroundings plus one-third the dry bulb temperature of said surroundings,
   c. applying a weighting factor of 0.7 to said first signal to provide a fourth signal,
   d. applying a weighting factor of 0.3 to said second signal to provide said third signal,
   e. electronically summating said third and fourth signals to provide a weighted summation signal,
   f. comparing said weighted summation signal with a reference signal to provide a fifth signal corresponding to the difference therebetween, and
   g. providing said fifth signal to indicator means whereby an indication is obtained corresponding to the wet bulb globe temperature of said surroundings.

2. Apparatus for determining the wet bulb globe temperature of surroundings including:
   a. a wet bulb thermometer for locating in said surroundings and incorporating a first temperature sensor to provide a first signal representative of the wet bulb temperature of said surroundings,
   b. a globe thermometer having a globe of a predetermined diameter for locating in said surroundings and incorporating a second temperature sensor to provide a second signal representative of the measured globe thermometer temperature of the surroundings, said predetermined diameter being such that the measured globe thermometer temperature closely approximates the sun of two-thirds the standard 6 inch globe temperature of said surroundings plus one-third the dry bulb temperature of said surroundings,
   c. first weighting means for applying a weighting factor of 0.3 to said second signal to provide a third signal,
   d. second weighting means for applying a weighting factor of 0.7 to said first signal to provide a fourth signal,
   e. summation means for electronically summating said third and fourth signals to provide a weighted summation signal,
   f. comparing means for obtaining the difference between said weighted summation signal and a reference signal to provide a fifth signal corresponding to the wet bulb globe temperature of said surroundings, and
   g. indicator means for receiving said fifth signal and responding thereto to provide an indication corresponding to the wet bulb globe temperature of said surroundings.

3. Apparatus according to claim 2 wherein the predetermined diameter of the globe of said globe thermometer lies in the range 1.45 to 1.85 inches.

4. Apparatus according to claim 3 wherein the predetermined diameter of the globe of said globe thermometer is 1.65 inches.

5. Apparatus according to claim 2 wherein said second temperature sensor is a silicon diode temperature sensor within said globe.

6. Apparatus according to claim 3 wherein said second temperature sensor is a silicon diode temperature sensor within said globe.

7. Apparatus according to claim 2 wherein:
  a. said first and second temperature sensors are silicon diode temperature sensors connected respectively in series with first and second resistors across output leads of a regulated source of potential, and
  b. said first weighting means includes a third resistor having one end connected to the junction of said first temperature sensor and said first resistor, and said second weighting means includes a fourth resistor having one end connected to the junction of said second temperature sensor and said second resistor.

8. Apparatus according to claim 3 wherein:
  a. said first and second temperature sensors are silicon diode temperature sensors connected respectively in series with first and second resistors across output leads of a regulated source of potential, and
  b. said first weighting means includes a third resistor having one end connected to the junction of said first temperature sensor and said first resistor, and said second weighting means includes a fourth resistor having one end connected to the junction of said second temperature sensor and said second resistor.

9. Apparatus according to claim 5 wherein:
  a. said first and second temperature sensors are silicon diode temperature sensors connected respectively in series with first and second resistors across output leads of a regulated source of potential, and
  b. said first weighting means includes a third resistor having one end connected to the junction of said first temperature sensor and said first resistor, and said second weighting means includes a fourth resistor having one end connected to the junction of said second temperature sensor and said second resistor.

10. Apparatus according to claim 2 wherein:
  a. said first and temperature sensors are silicon diode temperature sensors connected respectively in series with first and second resistors across output leads of a regulated source of potential,
  b. said first weighting means includes a third resistor having one end connected to the junction of said first temperature sensor and said first resistor, and said second weighting means includes a fourth resistor having one end connected to the junction of said second temperature sensor and said second resistor,
  c. the other ends of said third and fourth resistors being connected together in a common junction, and
  d. said comparing means is an operational amplifier having its positive non-inverting input connected to said common junction and its negative inverting input connected to said reference signal, said reference signal being a voltage derived from said regulated source of potential.

11. Apparatus according to claim 3 wherein:
  a. said first and second temperature sensors are silicon diode temperature sensors connected respectively in series with first and second resistors across output leads of a regulated source of potential,
  b. said first weighting means includes a third resistor having one end connected to the junction of said first temperature sensor and said first resistor, and said second weighting means includes a fourth resistor having one end connected to the junction of said second temperature sensor and said second resistor,
  c. the other ends of said third and fourth resistors being connected together in a common junction, and
  d. said comparing means is an operational amplifier having its positive non-inverting input connected to said common junction and its negative inverting input connected to said reference signal, said reference signal being a voltage derived from said regulated source of potential.

12. Apparatus according to claim 5 wherein:
  a. said first and second temperature sensors are silicon diode temperature sensors connected respectively in series with first and second resistors across output leads of a regulated source of potential,
  b. said first weighting means includes a third resistor having one end connected to the junction of said first temperature sensor and said first resistor, and said second weighting means includes a fourth resistor having one end connection to the junction of said second temperature sensor and said second resistor,
  c. the other ends of said third and fourth resistors being connected together in a common junction, and
  d. said comparing means is an operational amplifier having its positive non-inverting input connected to said common junction and its negative inverting input connected to said reference signal, said reference signal being a voltage derived from said regulated source of potential.

13. Apparatus according to claim 2 wherein:
  a. said first and second temperature sensors are silicon diode temperature sensors connected respectively in series with first and second resistors across output leads of a regulated source of potential,
  b. said first weighting means includes a third resistor having one end connected to the junction of said first temperature sensor and said first resistor, and said second weighting means includes a fourth resistor having one end connected to the junction of said second temperature sensor and said second resistor,
  c. the other ends of said third and fourth resistors being connected together in a common junction,
  d. said comparing means is an operational amplifier having its positive non-inverting input connected to said common junction and its negative inverting input connected to said reference signal, said reference signal being a voltage derived from said regulated source of potential, and
e. a negative feedback connection from the output of said operational amplifier to said negative inverting input of said operational amplifier.

14. Apparatus according to claim 3 wherein:
a. said first and second temperature sensors are silicon diode temperature sensors connected respectively in series with first and second resistors across output leads of a regulated source of potential,
b. said first weighting means includes a third resistor having one end connected to the junction of said first temperature sensor and said first resistor, and said second weighting means includes a fourth resistor having one end connected to the junction of said second temperature sensor and said second resistor,
c. the other ends of said third and fourth resistors being connected together in a common junction,
d. said comparing means is an operational amplifier having its positive non-inverting input connected to said common junction and its negative inverting input connected to said reference signal, said reference signal being a voltage derived from said regulated source of potential, and
e. a negative feedback connection from the output of said operational amplifier to said negative inverting input of said operational amplifier.

15. Apparatus according to claim 5 wherein:
a. said first and second temperature sensors are silicon diode temperature sensors connected respectively in series with first and second resistors across output leads of a regulated source of potential,
b. said first weighting means includes a third resistor having one end connected to the junction of said first temperature sensor and said first resistor, and said second weighting means includes a fourth resistor having one end connected to the junction of said second temperature sensor and said second resistor,
c. the other ends of said third and fourth resistors being connected together in a common junction,
d. said comparing means is an operational amplifier having its positive non-inverting input connected to said common junction and its negative inverting input connected to said reference signal, said reference signal being a voltage derived from said regulated source of potential, and
e. a negative feedback connection from the output of said operational amplifier to said negative inverting input of said operational amplifier.

16. Apparatus according to claim 2 wherein:
a. said first and second temperature sensors are silicon diode temperature sensors connected respectively in series with first and second resistors across output leads of a regulated source of potential,
b. said first weighting means includes a third resistor having one end connected to the junction of said first temperature sensor and said first resistor, and said second weighting means includes a fourth resistor having one end connected to the junction of said second temperature sensor and said second resistor,
c. the other ends of said third and fourth resistors being connected together in a common junction,
d. said comparing means is an operational amplifier having its positive non-inverting input connected to said common junction and its negative inverting input connected to said reference signal, said reference signal being a voltage derived from said regulated source of potential, and
e. said regulated source of potential includes a further operational amplifier with its negative input terminal connected to the junction of fifth and sixth resistors connected in series across said output leads of said regulated source of potential, the output of said further operational amplifier being connected to the positive one of said output leads of said regulated source of potential, and its positive non-inverting input being connected to the source electrode of a field-effect transistor which is also connected to the negative one of said output leads through seventh and eighth resistors in series, the gate electrode of said field-effect transistor being connected to the junction of said seventh and eighth resistors, and the drain electrode of said field-effect transistor being connected to said positive one of said output leads.

17. Apparatus according to claim 3 wherein:
a. said first and second temperature sensors are silicon diode temperature sensors connected respectively in series with first and second resistors across output leads of a regulated source of potential,
b. said first weighting means includes a third resistor having one end connected to the junction of said first temperature sensor and said first resistor, and said second weighting means includes a fourth resistor having one end connected to the junction of said second temperature sensor and said second resistor,
c. the other ends of said third and fourth resistors being connected together in a common junction,
d. said comparing means is an operational amplifier having its positive non-inverting input connected to said common junction and its negative inverting input connected to said reference signal, said reference signal being a voltage derived from said regulated source of potential, and
e. said regulated source of potential includes a further operational amplifier with its negative input terminal connected to the junction of fifth and sixth resistors connected in series across said output leads of said regulated source of potential, the output of said further operational amplifier being connected to the positive one of said output leads of said regulated source of potential, and its positive non-inverting input being connected to the source electrode of a field-effect transistor which is also connected to the negative one of said output leads through seventh and eighth resistors in series, the gate electrode of said field-effect transistor being connected to the junction of said seventh and eighth resistors, and the drain electrode of said field-effect transistor being connected to said positive one of said output leads.

18. Apparatus according to claim 5 wherein:
a. said first and second temperature sensors are silicon diode temperature sensors connected respectively in series with first and second resistors across output leads of a regulated source of potential,
b. said first weighting means includes a third resistor having one end connected to the junction of said first temperature sensor and said first resistor, and said second weighting means includes a fourth resistor having one end connected to the junction of said second temperature sensor and said second resistor,
c. the other ends of said third and fourth resistors being connected together in a common junction,
d. said comparing means is an operational amplifier having its positive non-inverting input connected to said common junction and its negative inverting input connected to said reference signal, said reference signal being a voltage derived from said regulated source of potential, and
e. said regulated source of potential includes a further operational amplifier with its negative input terminal connected to the junction of fifth and sixth resistors connected in series across said output leads of said regulated source of potential, the output of said further operational amplifier being connected to the positive one of said output leads of said regulated source of potential, and its positive non-inverting input being connected to the source electrode of a field-effect transistor which is also connected to the negative one of said output leads through seventh and eighth resistors in series, the gate electrode of said field-effect transistor being connected to the junction of said seventh and eighth resistors, and the drain electrode of said field-effect transistor being connected to said positive one of said output leads.

19. Apparatus according to claim 2 wherein:
a. said first and second temperature sensors are silicon diode temperature sensors connected respectively in series with first and second resistors across output leads of a regulated source of potential,
b. said first weighting means includes a third resistor having one end connected to the junction of said first temperature sensor and said first resistor, and said second weighting means includes a fourth resistor having one end connected to the junction of said second temperature sensor and said second resistor,
c. the other ends of said third and fourth resistors being connected together in a common junction,
d. said comparing means is an operational amplifier having its positive non-inverting input connected to said common junction and its negative inverting input connected to said reference signal, said reference signal being a voltage derived from said regulated source of potential, and
e. a meter overload protection means connected between said operational amplifier and said indicator means, said meter overload protection means comprising two diodes oppositely-connected face-to-face in the lead from the output of said further operational amplifier to the input of said indicator means, and a field-effect transistor connected between the junction of said two diodes and a negative potential with its drain electrode connected to said junction between the two diodes.

20. Apparatus according to claim 2 wherein said indicator means includes an indicating pointer movable over a scale calibrated in wet bulb globe temperature degrees and wherein said apparatus is constructed as a portable instrument.

* * * * *

UNITED STATES PATENT OFFICE
CERTIFICATE OF CORRECTION

Patent No. 3,855,863   Dated December 24, 1974

Inventor(s) Lorne A. Kuehn et al.

It is certified that error appears in the above-identified patent and that said Letters Patent are hereby corrected as shown below:

On the cover sheet insert:

-- [30] Foreign Application Priority Data

Canada        167562       March 30, 1973 --.

Signed and Sealed this second Day of December 1975

[SEAL]

Attest:

RUTH C. MASON
*Attesting Officer*

C. MARSHALL DANN
*Commissioner of Patents and Trademarks*